Nov. 29, 1932.    M. COUADE    1,889,465
DEVICE FOR THE AUTOMATIC STOP OF THE FILM IN A CINEMATOGRAPH
Filed Feb. 28, 1930
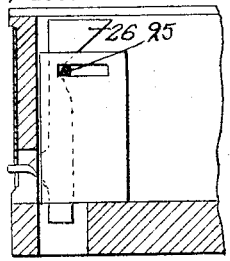
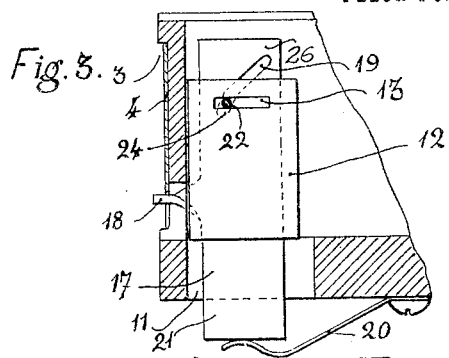
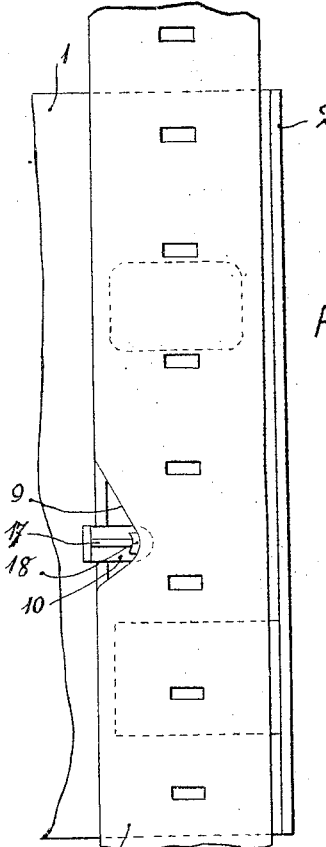
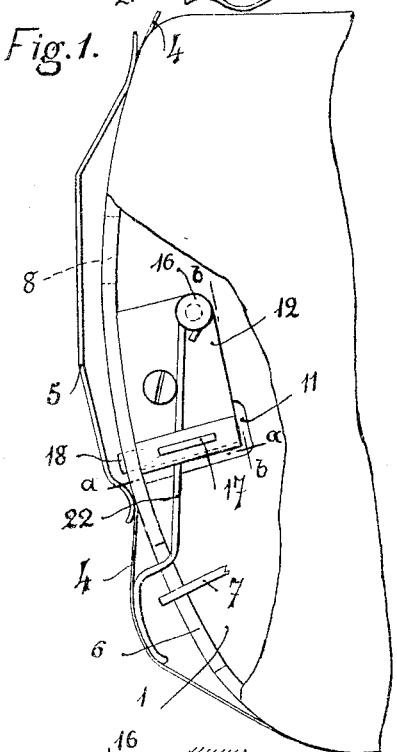
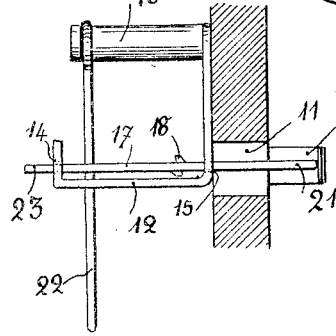
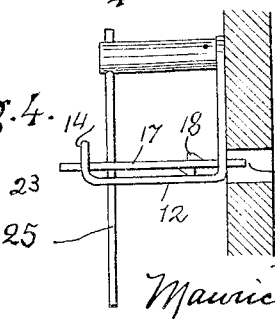
Inventor
Maurice Couade
by B Singer
Atty Patented Nov. 29, 1932

1,889,465

UNITED STATES PATENT OFFICE

MAURICE COUADE, OF PARIS, FRANCE

DEVICE FOR THE AUTOMATIC STOP OF THE FILM IN A CINEMATOGRAPH

Application filed February 28, 1930, Serial No. 432,186, and in France February 28, 1929.

In a number of cinematographic devices, such as working machines, projectors and the like, notches are provided on the edge of the film in order to cause the release at the right moment of a suitable mechanism.

The present invention concerns a device using such notched films and producing their automatic stop in a cinematographic projector.

In this device, the mechanism being operated by the notch removes the film from the passage at the level of the claw window in order to bring same out of the reach of the claw, thus causing the stoppage of the film.

A first member under the action of a spring presses a catch against the notched edge of the film. A second member provided under the film at the level of the claw window is kept back in the bottom of the passage so as to avoid any contact with the film during the normal motion, and is mechanically connected to the first member in such a way that when the first member is moved by the catch falling into a notch a corresponding projection movement of the second member out of the bottom of the passage near the claw takes place, thus bringing the film out of the reach of the said claw.

Figures 1-4 show an example of realization of this device in application to a cinematographic projector with no toothed driver and with a bent passage. The driving mechanism of the film is not shown, only the end of the claw appears in Fig. 1. The squeezer of film also is represented in the same figure.

Fig. 1 is a side elevation of the back of the projector frame, the cover of the said frame being removed.

Fig. 2 shows an elevation seen from the back of the frame part near the film.

Figs. 3 and 4 are sections of the frame to show the mechanism in elevation.

Figs. 5 and 6 are sections of the frame showing a modified form of the mechanism.

In the drawing, 1 is the backside of the frame, 2 its cover and 3 the passage of the film; 4 shows the film, 5 the film squeezer, 6 the claw window, 7 the end of the claw, 8 is the projection window, 9 a notch in the film, 10 an opening in the bottom of the passage and providing a free way for the catch. 11 is an opening in the bottom of the frame giving a free way for the tail of a bolt bearing the catch. 12 is the sheet iron setting or guiding and supporting element of the mechanism, fixed to the frame under the form of a plate perpendicular to the edges of the passage; 13 is a guide slot perpendicular to the passage and provided in the said plate; the plate 12 has a guide member 14 perpendicular thereto, which guide member has a slot or guideway 15 through which the bolt 17 extends and in which said bolt is free to move axially, 16 is a spindle fixed to the setting. 17 is a flat bolt bearing a profiled and rounded catch 18 and provided with a slant slit 19 opposite the slit 13 of the setting. 20 is a spring acting on the tail 21 of the bolt, 22 is a wire film pusher freely mounted on the spindle 16, entering both slits 13 and 19 and coming out of the passage under the action of the spring. Such is the position assumed by the said pusher when a notch is reaching in front of the catch.

The film that is still not stretched is then driven away and stopped.

The Figs. 1-4 show the mechanism in that position.

When the bolt is driven in, for instance, by pressing on the head 23, the pusher enters the claw window, and the film starts now, the straight edge maintaining it in the position of normal feed.

Owing to the resistance opposed by the spring to the return of the pusher, and the angular relation of the roller and portion 24 of the bolt slit to the upper portion thereof, the resistance of the pusher, when fully gone out, to the action of the film stretched by the winding drum is much greater than the resistance of the slack film to the pressure of the pusher during the sudden coming out of same, thus giving to the mechanism a sufficient irreversibility in order to keep the film out of reach of the claw while stopped and notwithstanding the traction of the winding drum.

A modified form of the preceding mechanisms consists in using a steel wire spring pusher fixed on the spindle by its extremity, and bearing against the oblique slit. Then the spring acting on the tail of the bolt may be avoided, a slope being provided instead of the inclined slit. This construction is therefore simpler, but has not the advantage of the irreversibility.

This last form of execution is shown by the Figs. 5 and 6 in which 25 is the pusher fixed in the spindle, and 26 the slope of the bolt.

Having now described the object of this invention and in which manner same is to be performed, what I claim is:

1. In automatic stop mechanism for a notch film in a cinematograph, a pusher to move the film out of reach of the claw, a guide member, a bolt guided by the guide member and having a camming edge to operate the pusher, said bolt also having a member for engagement in a notch of the film so that said bolt is controlled in its pusher actuating movement by said notch.

2. Apparatus as claimed in claim 1, including a spring to yieldingly resist movement of the bolt in pusher withdrawing direction.

3. Apparatus as claimed in claim 1, in which the pusher is pivotally mounted and in which the guide element has a guide slot through which the pusher extends and in which the pusher is laterally movable and in which the bolt has a cam slot for actuating the pusher.

In witness whereof I affix my signature.

MAURICE COUADE.